United States Patent [19]
VanDelden et al.

[11] Patent Number: 5,111,330
[45] Date of Patent: May 5, 1992

[54] OPTICAL ISOLATORS EMPLOYING WAVELENGTH TUNING

[75] Inventors: Jay S. VanDelden, Montville; Donald K. Wilson, W. Caldwell, both of N.J.

[73] Assignee: Optics for Research, Caldwell, N.J.

[21] Appl. No.: 611,774

[22] Filed: Nov. 13, 1990

Related U.S. Application Data

[63] Continuation-in-part of Ser. No. 393,143, Aug. 14, 1989, abandoned.

[51] Int. Cl.⁵ .............................. G02F 1/09; G02B 1/08
[52] U.S. Cl. ..................................... 359/281; 359/283; 359/484
[58] Field of Search ............... 350/375, 376, 377, 378, 350/384, 390, 393; 359/280, 281, 282, 283, 484

[56] References Cited

U.S. PATENT DOCUMENTS

| | | | |
|---|---|---|---|
| 3,764,195 | 10/1973 | Blank et al. | 350/377 |
| 4,195,908 | 4/1980 | Kestigan et al. | 350/375 |
| 4,755,026 | 7/1988 | Honda et al. | 350/376 |
| 4,756,607 | 7/1988 | Watanabe et al. | 350/376 |
| 4,804,256 | 2/1989 | Wilson | 350/376 |
| 4,973,119 | 11/1990 | Taki | 350/377 |
| 4,974,944 | 12/1990 | Chang | 350/377 |

FOREIGN PATENT DOCUMENTS 63-77015  4/1988  Japan .................................. 350/378

OTHER PUBLICATIONS

Belt et al, "Growth of Bismuth Garnet Films for High Figure of Merit Faraday Effect Devices," *SPIE* vol. 753 (1987), pp. 142–149.

*Primary Examiner*—Bruce Y. Arnold
*Assistant Examiner*—Martin Lerner
*Attorney, Agent, or Firm*—John N. Bain; Raymond J. Lillie

[57] ABSTRACT

An improvement in a method of rotating the plane of polarization of polarized light in a Faraday rotator, having an optical element which includes a ferromagnetic material, which comprises varying the strength of the magnetic field generated along the optical axis of the optical element in response to changes in the wavelength of the polarized light. The magnet employed in the Faraday rotator may be at least one permanent magnet or an electromagnet. Preferred optical elements are made of disc having a gadolinium-gallium-garnet (GGG) or large lattice constant (LLC) substrate, and the substrate is coated with an oxygen—and iron—containing film.

14 Claims, 3 Drawing Sheets

FRACTION OF TRIAL DISTANCE ALONG
CYLINDRICAL AXIS OF PERMANENT MAGNET $H_S$ = H SATURATION $H_1$ < H SATURATION $H_2$ > H SATURATION

OPTICAL ISOLATORS EMPLOYING WAVELENGTH TUNING

This application is a continuation-in-part of application Ser. No. 393,143, filed Aug. 14, 1989 now abandoned.

This invention relates to optical isolators and Faraday rotators which rotate a plane of polarization of polarized light. More particularly, this invention relates to wavelength tuning of a Faraday rotator employing magnetically saturable optical elements made of ferromagnetic materials.

Optical isolators are devices which are used for operation with certain lasers or other light sources in the ultraviolet, visible, and infrared spectrums. An optical isolator permits the transmission of that light. An optical isolator is especially useful when used in conjunction with a laser in that it prevents optical feedback into the laser. This feedback is analogous to electronic feedback.

The optical isolator works by rotating the plane of polarization of polarized light as the polarized light passes through a medium known as an optical element. The optical element is contained within a means for generating a magnetic field along the optical axis of said optical element. The optical element is made of a material having a Verdet constant. The Verdet constant is a measure of the ability of a material to rotate the plane of polarization of polarized light when the material is contained within a magnetic field. The optical element and the means for generating a magnetic field along the optical axis of rotation of the optical element is known as a Faraday Rotator. An example of the means for generating the magnetic field for the Faraday rotator is in the form of an annulus, commonly referred to as a donut-shaped magnet which has a hole for containing the optical element, thereby surrounding the optical element.

An optical isolator is comprised of an input polarizer, followed by the Faraday rotator, followed by an output polarizer or analyzer. These three elements may be contained in a body.

Light emitted from a source enters an input polarizer. The input polarizer causes the light which enters the input polarizer from one direction to be linearly polarized. In this way, a plane of polarization of polarized light is formed. The polarized light then enters the optical element of the Faraday rotator, the optical element being surrounded by a means for generating a magnetic field such as a permanent magnet or an electromagnet. The generation of a magnetic field along the optical axis of traveling light contained in the optical element rotates the plane of polarization of polarized light to a desired angle of rotation $\theta$. Light exiting the Faraday rotator, its plane of polarization having been rotated, enters an output polarizer. The output polarizer has a plane of polarization parallel to that of the light exiting the Faraday rotator. The rotated polarized light which exits the output polarizer enters into a system or begins its intended use. One or more reflections of the polarized light may then occur. Some of the light may be reflected back toward the original source. The light traveling in the reverse direction is of random polarization. The reflected light then re-enters the output polarizer, wherein the reflected polarized light is re-polarized in a plane of polarization at an angle of rotation $\theta$. The reflected polarized light then exits the output polarizer and re-enters the optical element of the Faraday rotator. In the Faraday rotator the plane of polarization of the reflected polarized light is rotated by the desired angle of rotation $\theta$, thus resulting in a total angle of rotation $2\theta$. The reflected polarized light then exits the Faraday rotator and re-enters the input polarizer. When the total angle of rotation $2\theta$ equals 90°, extinction or maximum isolation of the reflected polarized light occurs in the input polarizer. In this way, optical feedback to the light source is prevented.

The optical element of the Faraday rotator may be made of a material which is generally classified as (a) paramagnetic; (b) diamagnetic; or (c) ferromagnetic. The optical element may be made of paramagnetic or diamagnetic glasses, or paramagnetic or diamagnetic crystals. Paramagnetic and diamagnetic optical elements are generally in the form of long cylindrical rods, which are surrounded by the means for generating a magnetic field along the optical axis of the optical element. When the optical element is made of a paramagnetic or diamagnetic material, the amount of rotation of the plane of polarization of polarized light is directly proportional to the strength of the magnetic field generated along the optical axis of the optical element.

With ferromagnetic optical elements, however, the amount of rotation of the plane of polarization of polarized light is directly proportional to the strength of the magnetic field generated, along the optical axis of the optical element until the magnetic field strength reaches a specific value, or saturation field strength, for a given wavelength of light, and the amount of rotation will not increase as the magnetic field strength is increased above this value.

Present Faraday rotators which use ferromagnetic optical elements are used in the saturation mode; i.e., such Faraday rotators are capable of only one specific amount of rotation because they are designed to use a magnet whose magnetic field strength is at least that of the saturating value at the points where the magnetic field is generated along the optical axis of the optical element. Because the optimum performance of a Faraday rotator and optical isolator is achieved at 45° rotation of the plane of polarization of polarized light, and because the value of rotation is proportional to the wavelength of light being used, present optical isolators using a ferromagnetic material are usable at only one wavelength of light. At other wavelengths, the rotation would be other than 45°, thus causing a deterioration of the performance of the optical isolator.

It is therefore an object of the present invention to employ a Faraday rotator including an optical element made of a ferromagnetic material which may be used at more than one wavelength of light.

In accordance with an aspect of the present invention, there is provided an improvement in a method of rotating the plane of polarization of polarization of polarized light in a Faraday rotator. The Faraday rotator includes (i) an optical element having an optical axis, said optical element being formed from a composition including at least one ferromagnetic material; and (ii) a means for generating a magnetic field along the optical axis of the optical element. The improvement comprises varying the strength of the magnetic field generated along the optical axis of the optical element by said means for generating a magnetic field in response to changes in the wavelength of the polarized light. The means for generating a magnetic field along the optical axis of the optical element may be at least one permanent magnet or an electromagnet.

When a permanent magnet(s) is employed as the means for generating a magnetic field along the optical axis of the optical element, the magnet may be a hollow cylindrical magnet wherein the optical element is contained within the hollow opening. The magnet has a cylindrical axis, a portion of which is coincident with the optical axis of the optical element. The strength of the magnetic field along the cylindrical axis of the magnet typically varies along the length of the cylindrical axis. The magnetic field travels in a direction parallel to the direction in which the light travels. The optical axis of the optical element is coincident with at least a portion of the cylindrical axis, and is also coincident with the direction of travel of the magnetic field. At some points along the cylindrical axis, the magnetic field strength is above the saturation point for a given wavelength of light, whereas at other points along the cylindrical axis, the magnetic field strength is below the saturation point. Also, there may be one or more points along the cylindrical axis where the magnetic field strength equals the saturation point. Thus, when employing such a permanent magnet, one moves the optical element with respect to the magnet, or the magnet with respect to the optical element such that the optical axis of the optical element becomes coincident with a portion of the cylindrical axis of the magnet wherein the magnetic field strength generated along this portion fo the cylindrical axis is sufficient to achieve a desired rotation of the plane of polarization of polarized light. When one desires to employ a different wavelength of light, one would again move the magnet or the optical element so that the optical axis of the optical element would be coincident with a portion of the cylindrical axis of the magnet wherein the magnetic field strength would be sufficient to achieve a desired rotation of the plane of polarization of polarized light.

When an electromagnet is employed, the strength of the magnetic field is varied by varying the amount of electric current passing through the electromagnet.

In a preferred embodiment, the optical element is formed from at least one substrate, which may be in the form of a disc. The substrate is formed from a material selected from the class consisting of $Gd_3 Ga_5 O_{12}$ (or gadolinium-gallium-garnet, or GGG), and $Gd_{2.68} Ca_{0.32} Ga_{4.02} Mg_{0.33} Zr_{0.65} O_{12}$ (or large lattice constant, or LLC), and each of said at least one substrate(s) is coated with an iron- and oxygen-containing film. Preferably, the film also contains bismuth.

When a GGG substrate or disc is employed, a preferred film is of the composition:

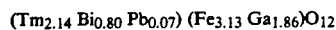

$(Tm_{2.14} Bi_{0.80} Pb_{0.07}) (Fe_{3.13} Ga_{1.86})O_{12}$

When an LLC substrate or disc is employed, a preferred film is of the composition: $(Bi_{1.09}Tm_{0.07} Gd_{0.95} Y_{0.09})(Fe_{3.91} Ga_{0.76} Y_{0.30} Tm_{0.02})O_{12}$.

Alternative iron- and oxygen- containing films which may be employed in coating the at least one disc(s), whether such disc(s) be made of GGG or LLC, include, but are not limited to, films formed from the compositions $(HoTbBi)_3Fe_5O_{12}$ (manufactured by Mitsubishi Gas Chemical Co.), $(YbTbBi)_3Fe_5O_{12}$ (manufactured by Sumitomo Metal Mining Co.), $Y_3Fe_5O_{12}$ (manufactured by the Airtron Division of Litton Industries), $(TbBi)_3(FeGa)_5O_{12}$, $(GdBi)_3(FeAlGa)_5O_{12}$, $(BiLuGd)_3Fe_5O_{12}$, lutetium-iron garnet films, and films formed from compositions having the formula: $Bi_x RE_{3-x} Fe_{5-y} Ga_y O_{12}$, wherein RE is a rare earth element, x is between 0.4 and 0.6, and y is between 0.8 and 1.2.

The optical element may, as described above, be comprised of at least one disc made of a gadolinium-gallium-garnet (GGG) or a larger lattice constant (LLC) material, as hereinabove described, coated with an iron and oxygen-containing film, also as hereinabove described. The total length of the film portion of the optical element is preferably from about 0.300 mm to about 0.400 mm. The optical element may be in the form of one disc coated with the film or a plurality of discs coated with the film of one of the types as hereinabove described. When a plurality of film-coated discs are employed, the film portion of each disc preferably has a length of from about 0.040 mm to about 0.050 mm. Each of the plurality of discs may be coated with the film on one or both faces. It is possible to remove the disc(s) from the film after the film has been deposited on the disc(s), thus resulting in an optical element consisting totally of the film material. One or more of such film-coated discs may comprise the optical element. Batch formulation for the films to be grown upon the GGG and LLC discs or substrates may be subjected to a melt prior to depositing of the batch formulations upon the substrates.

An example of a procedure for making GGG and LLC discs coated with bismuth-, iron,- and oxygen-containing films is described in Belt, et al., "Growth of Bismuth Garnet Films for High Figure of Merit Faraday Effect Devices," SPIE, Vol. 753, pgs. 142-149 (1987).

The optically transmitting film-coated discs are then coated with vacuum deposited antireflection coatings on the faces of the film-coated discs. The faces of the film-coated discs, when more than one film-coated disc is employed, may then be optically cemented or joined by a non-hardening optical gel, or the film-coated discs are air-spaced. Preferably, the optical gel or cement has an index of refraction which matches that of the film-coated discs. The antireflection coatings prevent reflections between the optical cement or gel or air and the faces of the discs. An example of optical gel which may be employed is sold as Cargille Optical Matching Gel, by Cargille Labs, of Cedar Grove, N. J. An example of optical cement is sold under the trade name Lensbond, by Summers Laboratory, of Ft. Washington, Pa.

The invention will now be described with respect to the drawings, wherein.

Figure 1:
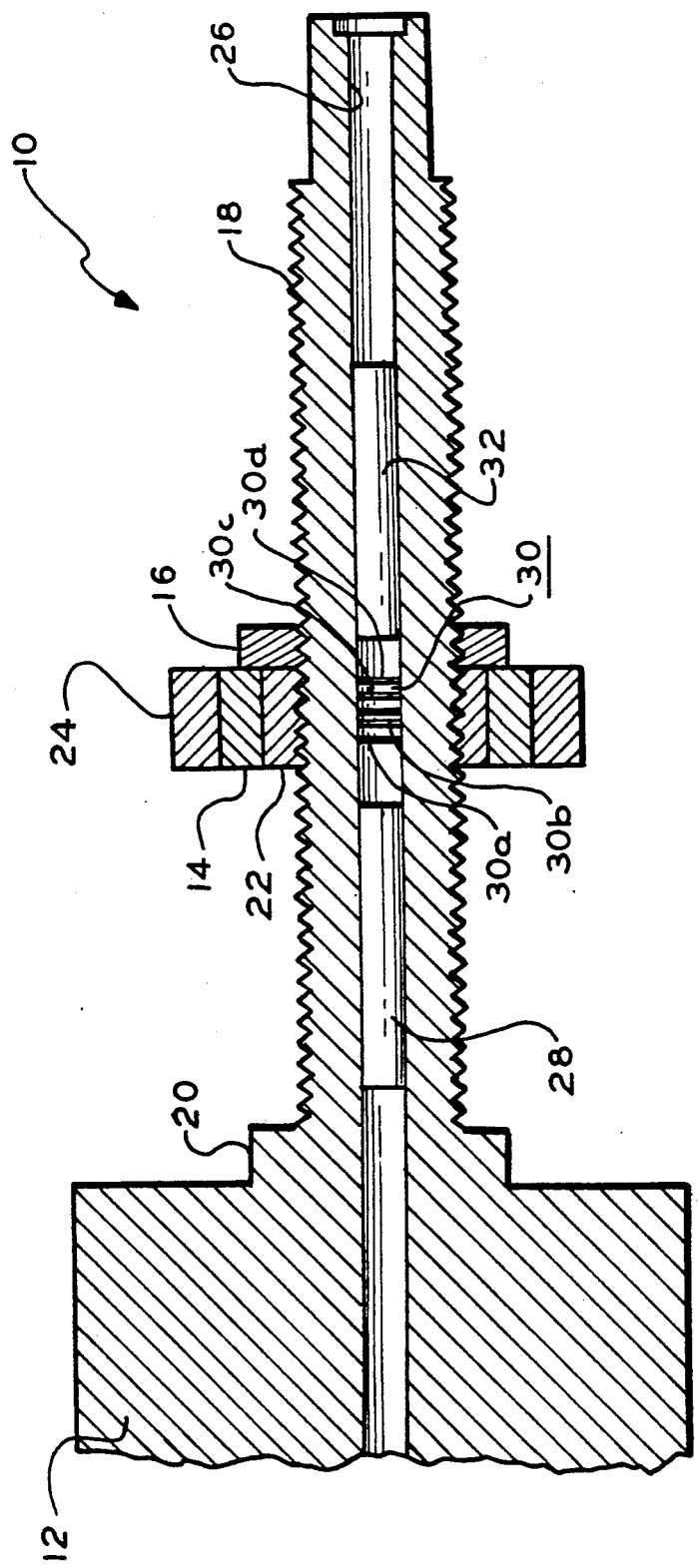
FIG. 1 is a cross-sectional view of an embodiment of an optical isolator having a movable permanent magnet, which may be employed in practicing the method of the present invention.

Referring now to the drawings, an embodiment of an optical isolator 10 which may be employed is practicing the method of the present invention includes a screw which includes a block portion 12, an abutting shoulder portion 20, and a threaded portion 18. Squared opening 26 runs through the block portion 12, shoulder portion 20, and threaded portion 18. Block portion 12 may be modified so as to attach other optical parts to block portion 12, if desired. Contained within squared opening 26 are an input polarizer 28 for polarizing waves or beams of light, an optical element 30, and an output polarizer 32. In the embodiment shown, optical element 30 is comprised of four squared "discs" 30a, 30b, 30c, and 30d. Each of the discs is comprised of a gadolinium-gallium-garnet (GGG) or large lattice constant (LLC) substrate coated with an iron-, and oxygen- containing film as hereinabove described. The discs 30a through 30d, are then joined together by optical cement or a non-hardening optical gel, which preferably has an index of refraction matching that of discs 30a through 30d or the discs may be air-spaced. Although four discs 30a through 30d are shown, it is to be understood that these discs are shown for illustrative purposes and that the scope of the present invention is not limited to such an embodiment.

Disposed on the outside of and adapted for screwing engagement with threaded portion 18 are magnet 14 and lock ring 16. Magnet 14 and lock ring 16 are both movable along the threaded portion 18 of the screw. Movement of magnet 14 along threaded portion 18 is limited by shoulder portion 20 and lock ring 16. Magnet 14 generates a magnetic field along its cylindrical axis, and is movable along threaded portion 18 in order to enable magnet 14 to generate a magnetic field along the optical axis of optical element 30. Magnet 14 and optical element 30, therefore, comprise the Faraday rotator portion of the optical isolator 10.

Located between magnet 14 and threaded portion 18 is bushing 22. Bushing 22 is in screwing engagement with threaded portion 18. Located on the outside of magnet 14 is a knurled collar 24. When one wishes to move magnet 14 along threaded portion 18, one grips and turns collar 24, which surrounds magnet 14, which surrounds bushing 22. By turning collar 24, therefore, one enables magnet 14 to move along threaded portion 18 through the movement of bushing 22.

As hereinabove described, optical element 30, comprised or discs 30a through 30d, is comprised of a ferromagnetic material. Such materials become magnetically saturated when the strength of the magnetic field generated along the optical axis of an optical element attains and/or exceeds a certain value; i.e., the rotation of the plane of polarization of polarized light cannot be increased once the saturating field strength for a given wavelength of light is attained.

Figure 2:
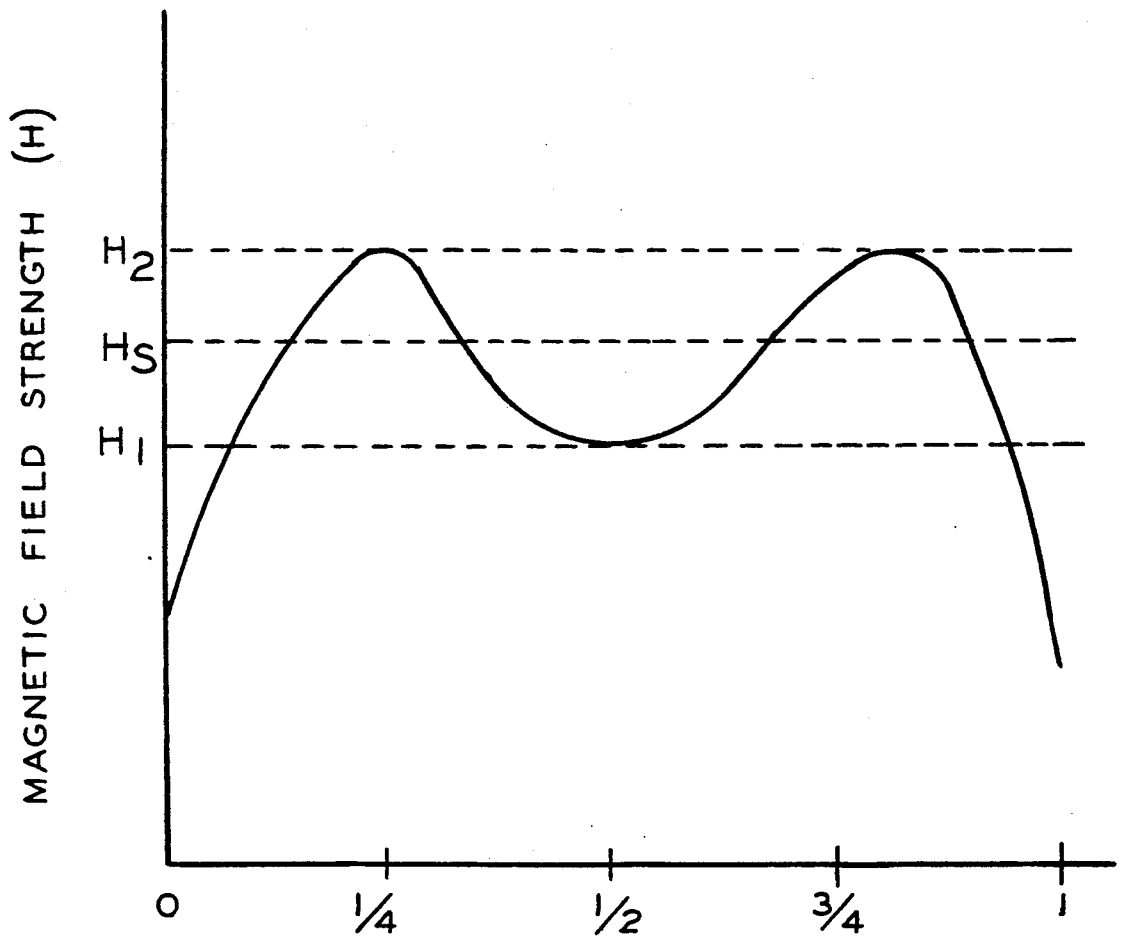
FIG. 2 is a graph illustrative of how magnetic field strength varies along the length of the cylindrical axis of a permanent magnet which generates a magnetic field along the optical axis of the optical element.
Figure 3:
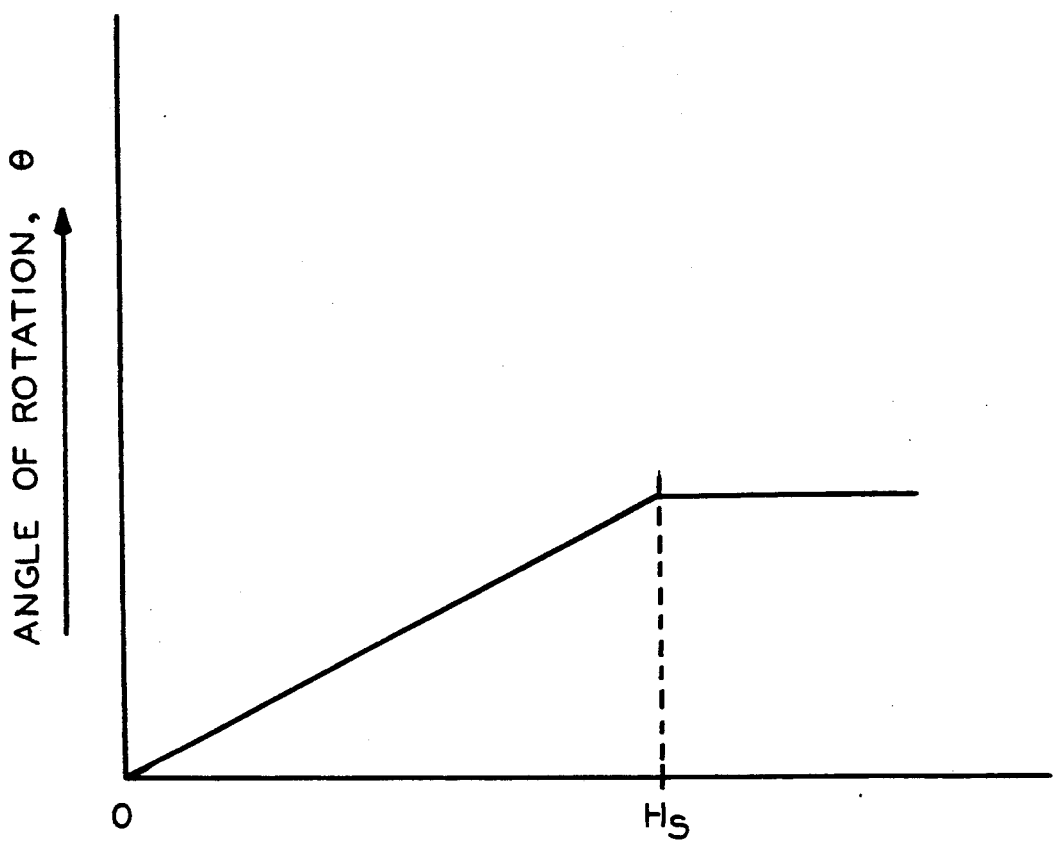
FIG. 3 is a graph illustrative of the relationship between magnetic field strength and the angle of rotation of the plane of polarization of polarized light about the optical axis of a ferromagnetic optical element.

It is also to be noted that the ferromagnetic optical element 30 has a thickness much less than that of magnet 14, which generates a magnetic field along the optical axis of optical element 30. Thus, the optical axis of optical element 30 will correspond to and be coincident with only a small portion of the cylindrical axis of magnet 14. As shown in FIG. 2, however, the strength of the magnetic field generated along various points of the length of the cylindrical axis by the permanent magnet varies. For most of the length of the cylindrical axis, the strength of magnetic field is between $H_1$ and $H_2$. $H_1$ is below the saturation field strength (H saturation or $H_s$) for a given wavelength of light, whereas $H_2$ is greater than $H_s$. As shown in FIG. 3, for the ferromagnetic materials herein described, the angle of rotation of the plane of polarization of polarized light about the optical axis of a ferromagnetic optical element increases as the magnetic field strength increases, until the magnetic field strength reaches H saturation or $H_s$. As the magnetic field strength is increased beyond $H_s$, the angle of rotation $\theta$ of the plane of polarization of polarized light does not increase and remains constant. In order to obtain the optimum rotation of the plane of polarization of polarized light about the optical axis of optical element 30, whether said light enters optical element 30 in the forward mode from input polarizer 28 or in the reverse mode from output polarizer 32, one would thus position nagnet 14 along threaded portion 18, and over optical element 30 such that a portion of magnet 14 which will generate a magnetic field along the optical axis of the optical element 30, which is sufficient to achieve a desired rotation of the plane of polarization of polarized light for a given wavelength of light passing through the optical element 30. Once magnet 14 is properly positioned over optical element 30, locking ring 16 is moved along threaded portion 18 so that it becomes contiguous with magnet 14, this preventing movement of magnet 14 from its proper position in relation to the given wavelength of light passing through optical element 30.

When one desires to change the optimization of the optical isolator 10 in response to a change in the wavelength of light which will pass through input polarizer 28, optical element 30, and output polarizer 32, one then repositions magnet 14 such that a portion of magnet 14, which generates a magnetic field sufficient to achieve a desired rotation of the plane of polarization of polarized light for this new wavelength of light, is positioned over the ooptical element 30. In this way, strength of the magnetic field generated along the optical axis of the ferromagnetic optical element may be varied by using an optical isolator having a permanent magnet.

It is to be understood, however, that the scope of the present invention is not to be limited to the hereinabove described embodiment employing a permanent magnet for generating a magnetic field along the optical axis of a ferromagnetic optical element. Other embodiments using a movable permanent magnet or magnets may be employed, or it is also possible to move the optical element with respect to a fixed permanent magnet okr magnets.

Figure 4:
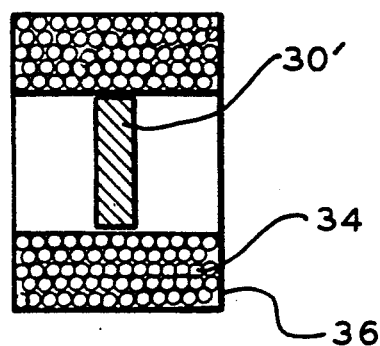
FIG. 4 is a cross-sectional view of an embodiment of a Faraday rotator having an electromagnet which surrounds an optical element.

It is also possible within the scope of the present invention to employ an electromagnet as the means for generating a magnetic field along the optical axis of the optic element. As shown in FIG. 4, an electromagnet 34, comprised of a plurality of coils 36, is wrapped around, and surrounds optical element 30', which may be constructed the same as, and be formed from, the same materials as, optical element 30. The passage of an electrical current through the coils 36 enables a magnetic field to be generated along the cylindrical axis of the coil and the optical axis of the optical element 30'. When an electromagnet 34 is employed, the strength of the magnetic field generated along the cylindrical axis of the coils 36 remains constant along the length of the cylindrical axis. In such a embodiment, therefore, movement of the electromagnet 34 coil with respect to the optical element 30' or of the optical element 30' with respect to the coils 36 is not necessary. In such an embodiment, the strength of the magnetic fiels is varied in response to changes in the wavelengths of light traveling through the input polarizer, ferromagnetic optical element, and output polarizer by varying the amount of electrical current passing through the coils 36. Once the saturating field strength for a particular wavelength is known, the amount of current passing through the coils 36 can be controlled so as to enable the electromagnetic coils 36 to generate a magnetic field having a strength sufficient to achieve a desired rotation of the plane of polarization of polarized light for that particular wavelength of light.

Advantages of the present invention include the ability to provide "wavelength tuning" in an optical isolator and Faraday rotator using an ooptical element containing a magnetically saturatable ferromagnetic material. The present invention enables one to vary the magnetic field strength along the optical axis of the ferromagnetic optical element in response to changes iin the wavelength of the polarized light through the optical element. Thus, the optical isolators and Faraday rotators of the present invention using a ferromagnetic optical element may be used to rotate the plane of polarization of various wavelengths of light. This wavelength tuning, as hereinabove described may be accomplished using Faraday rotators having either a permanent magnet or an electromagnet. When a permanent magnet is employed, the magnet may be moved with respect to the optical element or the optical element may be moved with respect to the magnet, such that a portion of the magnet which generates a magnetic field having a strength sufficient to achieve a desired rotation of the plane of polarization of polarized light, for a particular wavelength of light, is positioned over the ferromagnetic optical element. When an electromagnet is employed, the amount of current passing through an electromagnetic coil may be regulated so that the coil generates a magnetic field sufficient to achieve a desired rotation of the plane of polarization of polarized light for a particular wavelength of light.

It is to be understood however, that the scope of the present invention is not be limited to the specific embodiments described above. The invention may be practiced other than a particularly described and still be within the scope of the accompanying claims.

What is claimed is:

1. In a method of rotating the plane of polarization of polarized light in a Faraday rotator, said Faraday rotator including (i) an optical element having an optical axis, said optical element being formed from a composition including at least one ferromagnetic material, and said optical element being formed from at least one substrate in the form of a disc, and each of said at least one disc(s) is coated with an iron-and oxygen-containing film, and (ii) at least one permanent magnet for generating a magnetic field along the optical axis of the optical element, the improvement comprising:
varying the strength of magnetic fiels generated along the optical axis of the optical element by moving said at least one permanent magnet with respect to said optical element such that the strength of the magnetic field in said at least one ferromagnetic material is maintained at a level below the saturation point for said at least one ferromagnetic material in order to respond to changes in the wavelength of said polarized light.

2. The method of claim 1 wherein said optical element formed from a composition comprising at least one ferromagnetic material is formed from at least one substrate formed from a material selected from the class consisting of $Gd_3Ga_5O_2$ and $Gd_{2.68}Ca_{0.3\text{-}2}Ga_{4.02}Mg_{0.33}Zr_{0.65}O_{12}$, and each of said at said at least one substrate(s) is coated with an oxyen-, and iron - containing film.

3. The method of claim 2 wherein said film is formed from $(HoTbBi)_3Fe_5O_{12}$.

4. The method of claim 2 wherein said film is formed from $(YbTbBi)_3Fe_5O_{12}$.

5. The method of claim 2 wherein said film is formed from $Y_3Fe_5O_{12}$.

6. The method of claim 2 wherein said film is a lutetium-iron-garnet film.

7. The method of claim 2 wherein said film is formed from a composition having the formular:

$$Bi_xRE_{3-x}Fe_{5-y}Ga_yO_{12}.$$

wherein RE is a rare earth element, x is between 0.4 and 0.6, and y is between 0.8 and 1.2.

8. The method of claim 2 wherein said film is formed from $(TbBi)_3(FeGa)_5O_{12}$.

9. The method of claim 2 wherein said film is formed from $(GdBi)_3(FeAlGa)_5O_{12}$.

10. The method of claim 2 wherein said film is formed from $(BiLuGd)_3Fe_5O_{12}$.

11. The method of claim 2 wherein said film further contains bismuth.

12. The method of claim 11 wherein said at least one substrate is formed from $Gd_3 Ga_5 O_2$ and said film is of the formula:

$$(Tm_{2.14}Bi_{0.08}Pb_{0.07})(Fe_{3.13}Ga_{1.86})O_{12}.$$

13. The method of claim 11 wherein said at least one substrate is formed from $Gd_{2.68} Ca_{0.32} Ga_{4.02} Mg_{0.33} Zr_{0.65} O_{12}$ and said film is of the formula:

$$(Bi_{1.09}Tm_{0.07}Gd_{0.95}Y_{0.95})(Fe_{3.91}Ga_{0.76}Y_{0.30}Tm_{0.02})O_{12}.$$

14. The method of claim 1 wherein said at least one permanent magnet generates a magnetic field along a cylindrical axis, and the strength of said magnetic field generated along the optical axis of the optical element is varied in response to changes in the wavelength of said polarized light by moving said at least one permanent magnet with respect to said optical element such that a portion of said cylindrical axis along which is generated a magnetic field having a magnetic field strength sufficient to achieve a desired rotation of the plane of polarization of polarized light for the particular wavelength of light passing through said optical element, becomes coincident with the optical axis of said optical element.

* * * * *